(12) United States Patent
Moore et al.

(10) Patent No.: US 8,255,800 B2
(45) Date of Patent: Aug. 28, 2012

(54) SYSTEMS AND METHODS FOR FACILITATING ATTORNEY CLIENT RELATIONSHIPS, DOCUMENT ASSEMBLY AND NONJUDICIAL DISPUTE RESOLUTION

(75) Inventors: Charles Lee Moore, San Francisco, CA (US); Robert Elhardt, Corte Madera, CA (US)

(73) Assignee: Rocket Lawyer Incorporated, San Francisco, CA (US)

( * ) Notice: Subject to any disclaimer, the term of this patent is extended or adjusted under 35 U.S.C. 154(b) by 354 days.

(21) Appl. No.: 12/651,216

(22) Filed: Dec. 31, 2009

(65) Prior Publication Data

US 2011/0161826 A1    Jun. 30, 2011

(51) Int. Cl.
*G06F 3/00* (2006.01)
*G06F 3/01* (2006.01)

(52) U.S. Cl. ........ 715/705; 715/708; 715/738; 715/750; 715/751; 705/38; 705/311

(58) Field of Classification Search .................. 715/705, 715/708, 738, 750, 751
See application file for complete search history.

(56) References Cited

U.S. PATENT DOCUMENTS

| | | | | |
|---|---|---|---|---|
| 5,940,800 | A * | 8/1999 | Bennett et al. ................. | 705/311 |
| 7,058,661 | B2 * | 6/2006 | Ciaramitaro et al. ................. | 1/1 |
| 7,065,515 | B2 * | 6/2006 | Ciaramitaro et al. ................. | 1/1 |
| 7,130,858 | B2 * | 10/2006 | Ciaramitaro et al. ................. | 1/1 |
| 7,197,716 | B2 * | 3/2007 | Newell et al. ................. | 715/760 |
| 7,698,298 | B2 * | 4/2010 | Ciaramitaro et al. .. | 707/999.107 |
| 7,707,153 | B1 * | 4/2010 | Petito et al. ............ | 707/999.101 |
| 7,733,367 | B2 * | 6/2010 | Packer ........................ | 348/14.08 |
| 7,865,450 | B2 * | 1/2011 | Opsitnick et al. ............. | 705/311 |
| 7,890,405 | B1 * | 2/2011 | Robb .......................... | 705/36 R |
| 7,941,412 | B2 * | 5/2011 | Dunne et al. ................... | 707/694 |
| 8,032,533 | B1 * | 10/2011 | Spencer et al. ................ | 707/746 |
| 2002/0002469 | A1 * | 1/2002 | Hillstrom .......................... | 705/1 |
| 2002/0013767 | A1 * | 1/2002 | Katz .............................. | 705/39 |
| 2002/0019741 | A1 * | 2/2002 | Heston ............................ | 705/1 |
| 2002/0095378 | A1 * | 7/2002 | Cauchon et al. ................ | 705/40 |
| 2002/0143569 | A1 * | 10/2002 | Draughon .......................... | 705/1 |
| 2003/0028495 | A1 * | 2/2003 | Pallante ........................ | 705/78 |
| 2004/0083148 | A1 * | 4/2004 | Chadrow ........................ | 705/35 |
| 2004/0210540 | A1 * | 10/2004 | Israel et al. ..................... | 705/80 |
| 2004/0260569 | A1 * | 12/2004 | Bell et al. .......................... | 705/1 |
| 2005/0086179 | A1 * | 4/2005 | Mehmet .......................... | 705/80 |
| 2006/0190490 | A1 * | 8/2006 | Ritchey et al. ............. | 707/104.1 |
| 2006/0195430 | A1 * | 8/2006 | Arumainayagam et al. ...... | 707/3 |
| 2006/0242591 | A1 * | 10/2006 | Van Dok et al. ............... | 715/762 |
| 2008/0103823 | A1 * | 5/2008 | Papa ................................ | 705/2 |
| 2008/0208608 | A1 * | 8/2008 | Jeong ............................... | 705/1 |
| 2009/0113312 | A1 * | 4/2009 | Schoenberg ................... | 715/753 |
| 2009/0210558 | A1 * | 8/2009 | Bocook et al. .................... | 710/3 |
| 2010/0049563 | A1 * | 2/2010 | Lopez Seco ...................... | 705/7 |
| 2010/0106738 | A1 * | 4/2010 | Anderson ..................... | 707/769 |
| 2010/0241947 | A1 * | 9/2010 | Dahn et al. .................... | 715/233 |
| 2010/0241971 | A1 * | 9/2010 | Zuber .......................... | 715/753 |
| 2011/0066954 | A1 * | 3/2011 | Zuber .......................... | 715/751 |
| 2011/0107088 | A1 * | 5/2011 | Eng et al. ..................... | 713/155 |
| 2011/0137823 | A1 * | 6/2011 | Robb .......................... | 705/36 R |

* cited by examiner

*Primary Examiner* — Steven B Theriault
(74) *Attorney, Agent, or Firm* — Steven A. Nielsen; Allman & Nielsen, P.C.

(57) ABSTRACT

Computer network systems and related methods enable interactive legal document assembly by one or more persons working independently or collectively. The disclosed system facilitates optional lawyer engagements, attorney representations, review of documents, finalization of documents and nonjudicial dispute resolution in the event of disputes.

3 Claims, 7 Drawing Sheets

SYSTEMS AND METHODS FOR FACILITATING ATTORNEY CLIENT RELATIONSHIPS, DOCUMENT ASSEMBLY AND NONJUDICIAL DISPUTE RESOLUTION

COPYRIGHT AND TRADEMARK NOTICE

This application includes material which is subject or may be subject to copyright and/or trademark protection. The copyright and trademark owner(s) has no objection to the facsimile reproduction by any of the patent disclosure, as it appears in the Patent and Trademark Office files or records, but otherwise reserves all copyright and trademark rights whatsoever.

BACKGROUND OF THE INVENTION (1) Field of the Invention

In general the invention relates to systems of document generation and dispute resolution. More particularly, the invention relates to databases, networks, methods, graphical user interfaces and other means to facilitate the delivery of legal services and dispute resolution.

(2) Description of the Related Art

Database systems and document control methods are known in the related art. For example, U.S. Pat. No. 7,065,515 by Ciaramitaro and assigned to General Motors describes a system of storing, associating and selecting documents. But, the known related art fails to enable the nuanced production of legal documents integrated into a system to facilitate the specialized protocols for establishing attorney-client relationships.

BRIEF SUMMARY OF THE INVENTION

The present invention overcomes shortfalls many in the known related art by presenting an unobvious and unique combination and configuration of databases, user interfaces, document protocols, attorney client development procedures, dispute resolution procedures and other tools to create an efficient and confidential online environment suitable for the initiation and delivery of legal services.

The present invention solves other shortfalls in the related art by presenting a starter set of legal forms and sample legal documents to consumers and means of communication between consumers and a pool of legal professionals who have established presence within the system and who have access to the documents selected by the potential client. In the current attorney-client paradigm, various self help books are available to consumers and consumers have access to phone books and means to search the entire Internet for attorneys or law firms who have search friendly web sites. This traditional attorney search method fails to direct consumers to attorneys who are familiar with the literature in the hands of the consumer.

The disclosed system solves the current problem of consumers relying upon random and unreliable legal documents found on the Internet at large and then presenting unrealistic expectations and a faulty grasp of the law during initial meetings with attorneys. The disclosed system solves this problem by use of peer review, and other means of quality assurance such that only accurate and appropriate legal documents are presented to consumers who have entered the system. Legal professionals are rewarded within the system for authoring and reviewing legal documents and thus gain an ownership interest and familiarity with the system documents.

After an attorney-client relationship is established, the disclosed system uses various modules to confidentially present and exchange legal documents and communications between the attorney and client. Other modules facilitate electronic signing and verification of documents and require proof of identification before allowing the review of documents.

The invention presents many new advantages to the consumer by providing means of selection and review of legitimate legal documents and legal information that comport with the views of a pool of available attorneys. Consumers are also provided with means of drafting their own legal documents by use of system forms and assistance provided in videos, pictures and written instructions. Consumer completed forms may be optionally reviewed by a legal professional selected by the consumer. Thus, a consumer by act as a "pro per" within the legal system, but yet have access to legal help on an as needed basis.

The invention presents many new advantages to participating attorneys by, inter alia, providing a pool of potential clients who are not burdened with legal myths and unrealistic expectations. Attorneys within the system are also presented with modules to seamlessly track their time and expenses and that produce and deliver bills to clients.

Occasionally, attorney-client relationships and other relationships deteriorate. Traditionally, resolution of business disputes or attorney fee disputes involve costly discovery battles as each side attempts to locate or obfuscate documents and communications. The present invention overcomes this shortfall by tracking and storing all documents, communications, time records and billing statements. The invention discloses a non judicial dispute resolution system wherein a neutral arbitrator is presented with system documents and information as well as separate briefs and evidence provided by the parties.

Figure 1A:
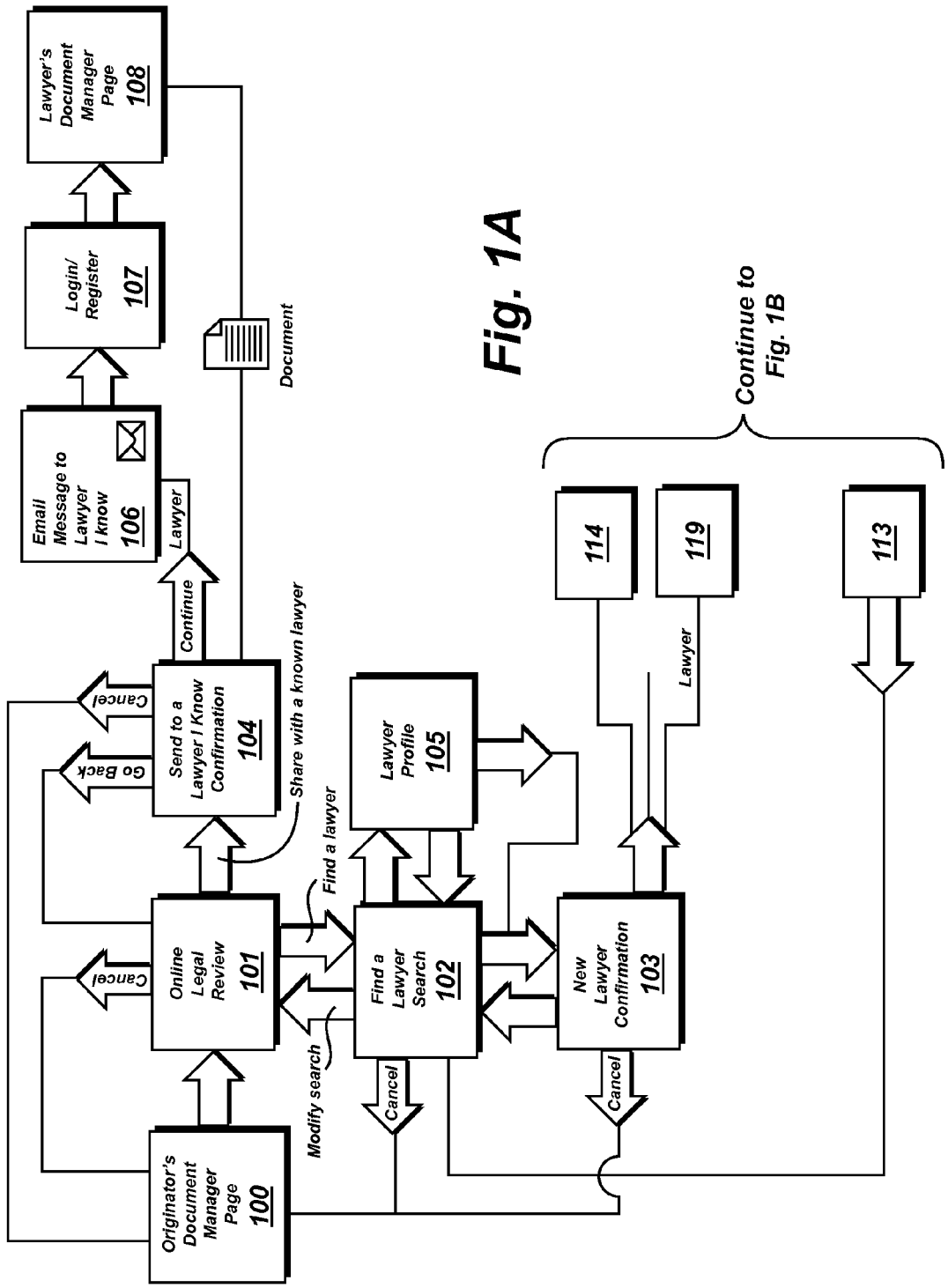
FIG. 1A and FIG. 1B comprise a schematic view of a lawyer selection system

REFERENCE NUMERALS IN THE DRAWINGS 100 originator's document manage page
101 online legal review page
102 find a lawyer search page
103 new lawyer confirmation page
104 send to a lawyer I know confirmation page
105 lawyer profile page
106 message to a lawyer I know page
107 login/register page
108 lawyer's document manager page
109 message to new lawyer
110 lawyer account management page
111 message to originator accepting invitation to provide legal review
112 view invitation page
113 message to originator declining legal review
114 document
115 document security mechanism and protocol 116 document sharing confirmation
118 message to lawyer
119 invitation to communicate
200 document manager
201 share information page
202 share confirmation page
203 originator's account management page
204 word processor
205 change in document notification page or message
206 document versions
207 document history
208 message to share receipt
209 recipient's document manager page
210 recipient's account management page
211 printer
212 paper mail with unsigned paper documents
213 paper document with physical signature
214 paper mail with signed copies of paper documents
215 storage container for paper documents
216 electronic document with digital or electronic signatures
217 server with means of sharing electronic documents with all interested parties
218 means of storage of electronic data, may be accessed electronically
219 document importation into legal network system
300 system interface for creating an agreement for system arbitration
301 agreement for system arbitration formed outside of system
302 escrow system to hold disputed funds
303 means of accepting electronic evidence
304 arbitrator review of evidence
305 arbitrator decision
306 release of funds from escrow if applicable
400 document selection page
401 document information page
402 document interview page
403 document preview page
404 assistance in competing document
405 document review page
406 document completion page
407 how to guide page
408 portal to other pages within the system
500 the system in general
600 lawyer
700 client or consumer
800 outside party, such as a business partner, colleague or family member

DETAILED DESCRIPTION OF EMBODIMENTS OF THE INVENTION

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed to these terms by workers in the art.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portions of this application.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

All the above references and U.S. patents and applications are incorporated herein by reference. Aspects of the invention can be modified, if necessary, to employ the systems, functions and concepts of the various patents and applications described above to provide yet further embodiments of the invention.

These and other changes can be made to the invention in light of the above detailed description. In general, the terms used in the following claims, should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

Figure 1B:
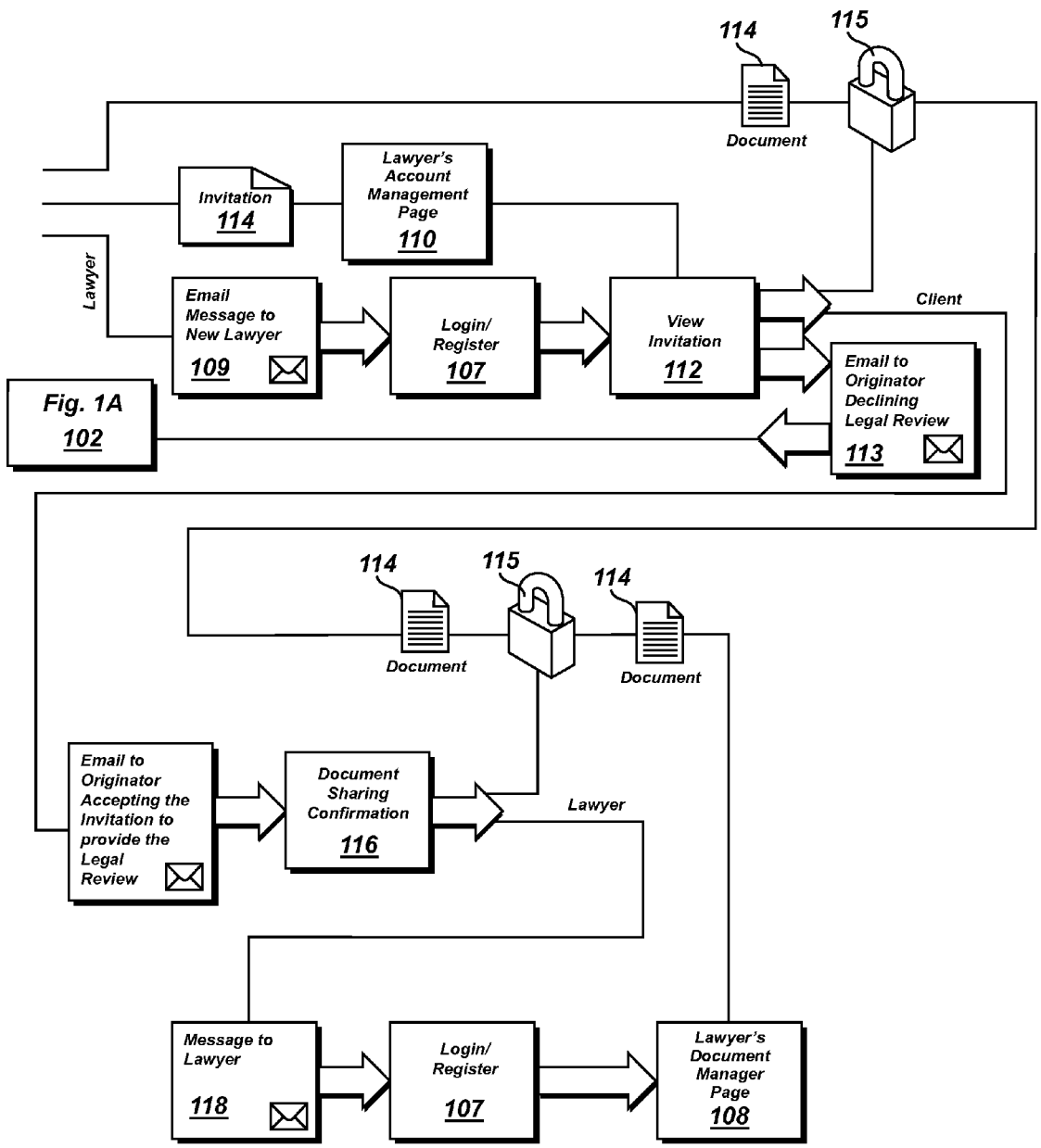

Referring to FIG. 1A and FIG. 1B, an originator's document manager page 100 provides a selection of legal forms and legal information. After completing or partially completing a document, the consumer may enter a legal review page 101 and transmit and share a document with a known lawyer. In the event the consumer does not know a lawyer, a lawyer may be found via a system search as shown the lawyer search page 102. A lawyer profile page 105 lists lawyers within the system and presents lawyers according to criteria selected by the consumer. Once a lawyer has been selected, a send to a lawyer page 104 provides means to confirm the address and identity of the proposed recipient before a document and/or personal message is sent to a selected lawyer. Moreover, a new lawyer confirmation page 103 provides information regarding attorney-client privileges and duties of confidentiality.

The selected lawyer will receive a message 106, the message having a link or other means to access the consumer prepared document. Upon activating such a link, the lawyer will enter a page 107 to login or register with the system. Upon logging in, the document is displayed within a lawyer's document manger page 108.

Prior to sharing documents with a lawyer, a consumer establishes a relationship with a selected lawyer by sending the lawyer an invitation to communicate 119 which may be viewed by a lawyer on a lawyer's account management page 110.

Figure 2:
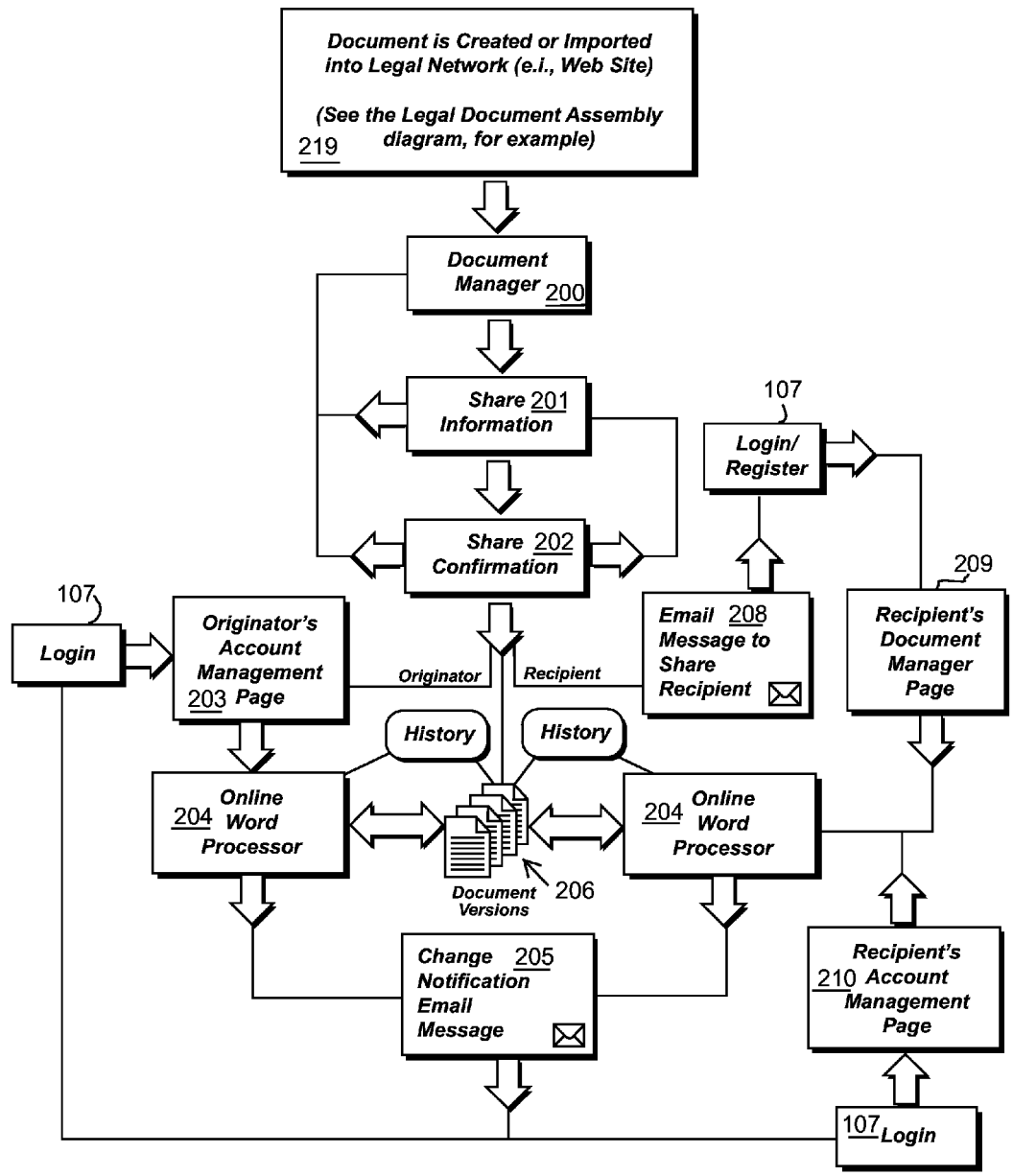
FIG. 2 is a schematic view of a document assembly and transport system

Referring to FIG. 2, a schematic is shown starting with a document being imported 219 into the disclosed system, the system sometimes being referred to as a legal network, suitable for use upon a web site or other electronic network system. Documents may enter a document manger page 200. The document manger page 200 or document manger interface may be considered as a control center for assembling, transmitting or sharing documents. A consumer or document originator may move to a share information 201 interface and find means of collaboration with a chosen person. The share information 201 allows for the insertion of a personal message and designation of document rights, allowing or disallowing a recipient to edit a sent document. A share confirmation 202 function or message allows a consumer or document originator to confirm the release of documents to the intended recipient.

The originator's account management page 203 or interface may display all documents created by the originator, the status of all documents, history of revisions. An originator may move to an online word processor 204 to further edit documents. Each saved document version is saved in a history 207 database. After revising a document, the originator has the option of notifying a recipient of such changes. Messages to a document share recipient 208 may take the form of email and prompt a recipient to login or register 107 into the system before accessing a recipient's document manager page 209. The document manger page 209 or interface may display a shared page, print a shared page and, with appropriate permission, allow editing. A recipient's account management 210 page displays documents transmitted by an originator and the status of such documents. The recipient's account management 210 page also allows access to further editing, document revision history and other document attributes. Notice of document changes may be transmitted via a change notification message 205.

Figure 3:
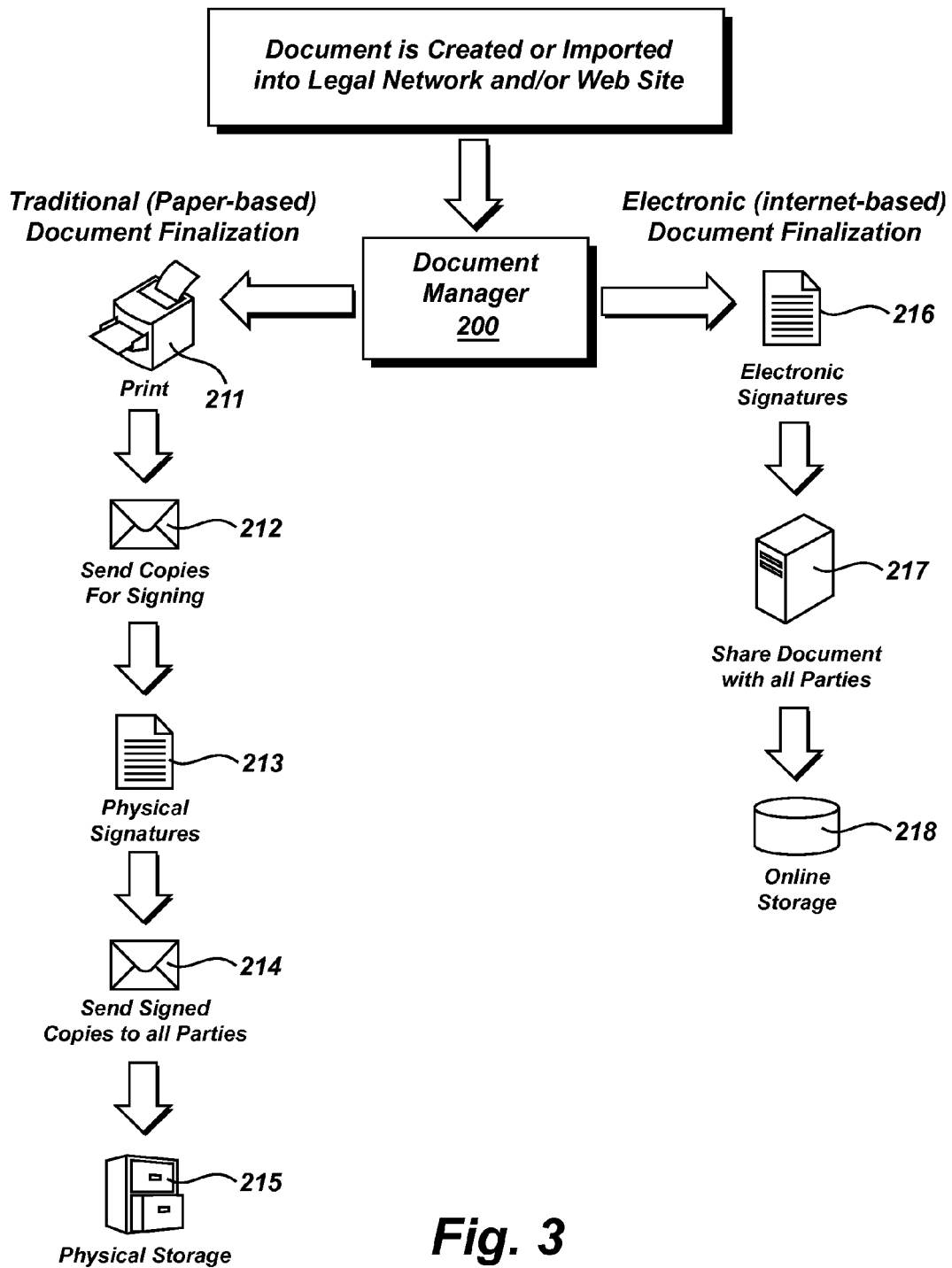
FIG. 3 is a comparison of paper based document finalization of the prior art as compared to electronic based document finalization in the invention.

Referring to FIG. 3, the left hand column illustrates a traditional or paper based document production and finalization while the right hand column illustrates an electronic document production and finalization. In either method, documents may be provided by a document manager 200 and proceed either to a traditional method or to an electronic method. Under the traditional method, a document may take a physical form by use of a printer 211. A hard copy or paper copy 212 of the document is then ready for signing. Physical signatures 213 may be placed or written upon the documents, wherein the signed documents 214 may be sent to all interested parties. Each receiving party then has the burden of placing a received document into a physical storage 215 container.

Referring to the right hand side of FIG. 3, a document manager 200 may produce documents in electronic form and suitable for electronic signatures 216. After electronic signing, the electronic documents may be electronically sent to a server 217, the server having means of transmitting and/or sharing electronic documents and/or electronic media. After review, the signed and shared documents may be stored upon a server, an online storage system 218, hard drive or other means.

Figure 4:
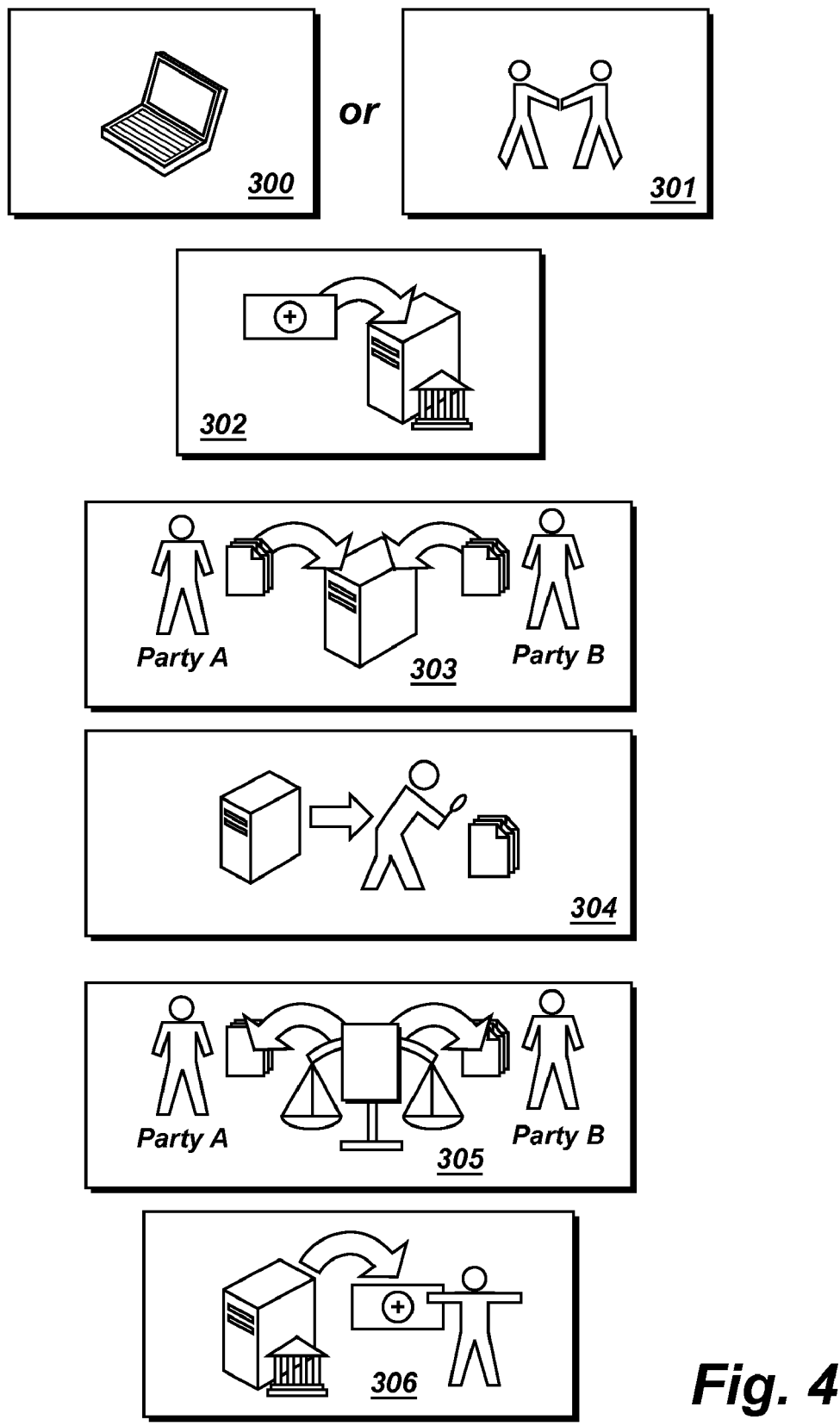
FIG. 4 is a schematic view of an arbitration system

Referring to FIG. 4, a method of dispute resolution is illustrated, the method comprising a system interface 300 for creating an agreement for use of the disclosed arbitration method. Alternatively, an agreement 301 reached outside of the disclosed system may be integrated into the system. In either case, the method includes an escrow system 302 to hold or control disputed funds or disputed property. Items may be placed under control of the escrow system prior to a dispute. During or after a transaction, the system collects electronic evidence and has means 303 of accepting electronic evidence. In arbitrations regarding transactions occurring by use of the disclosed document management system, most relevant documents will already be stored within the system. After all evidence and briefs have been entered into the system, an arbitrator will review the evidence 304 and render a decision 305, which will provide instructions for the release 306 of escrow funds. The disclosed method of dispute resolution is well suited for conflicts between business partners as well as conflicts between attorneys and their clients.

Figure 5:
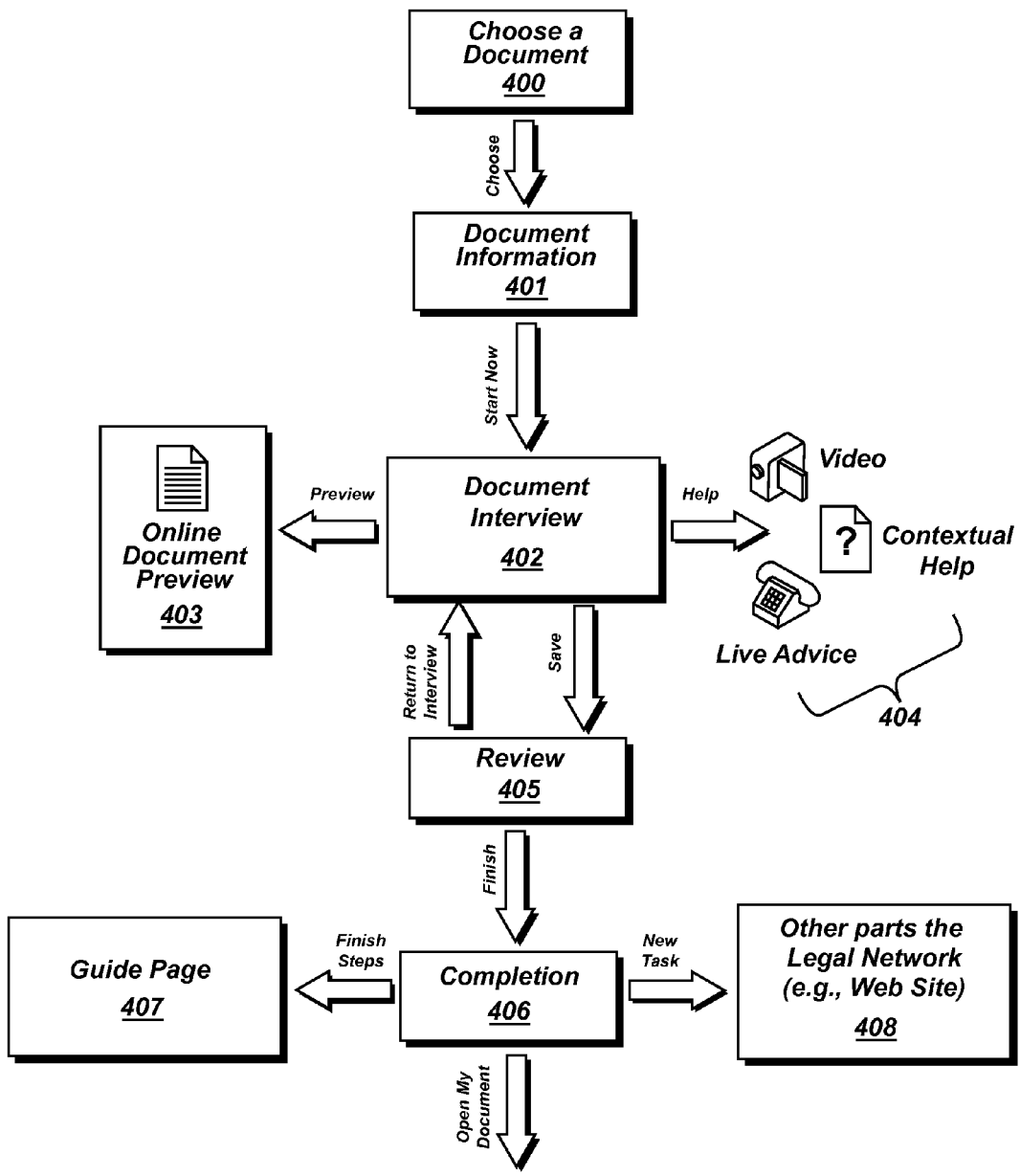
FIG. 5 is a schematic view of a document interview system

Referring to FIG. 5, a document interview process may begin by the selection of a document 400. A document originator may select from any number of forms. After selection of a document a user may be presented with document information 401 pertaining to the selected document. After review of the presented information, a user may then launch the document interview 402 process for assistance in filing out or completing the selected form. The document interview process 402 may include interrogation of the user to elicit information needed to complete the selected form. Various methods of assistance 404 may be made available; such assistance may include contextual help displays, video and live person advice. At any point during the document interview process, an online document preview 403 is available for review. At any point in the process, the pending document or selected form may be saved within the system and reviewed or completed in another sitting.

After completion of the selected form, a completion stage 406 or completion page provides means to review a guide page 407, start another task upon other parts 408 of the network, or open the completed document within the document manager 200. The guide page 407 may be considered a guide for understanding the potential use of the completed document and a guide for printing, signing, sharing and storing the document.

Figure 6:
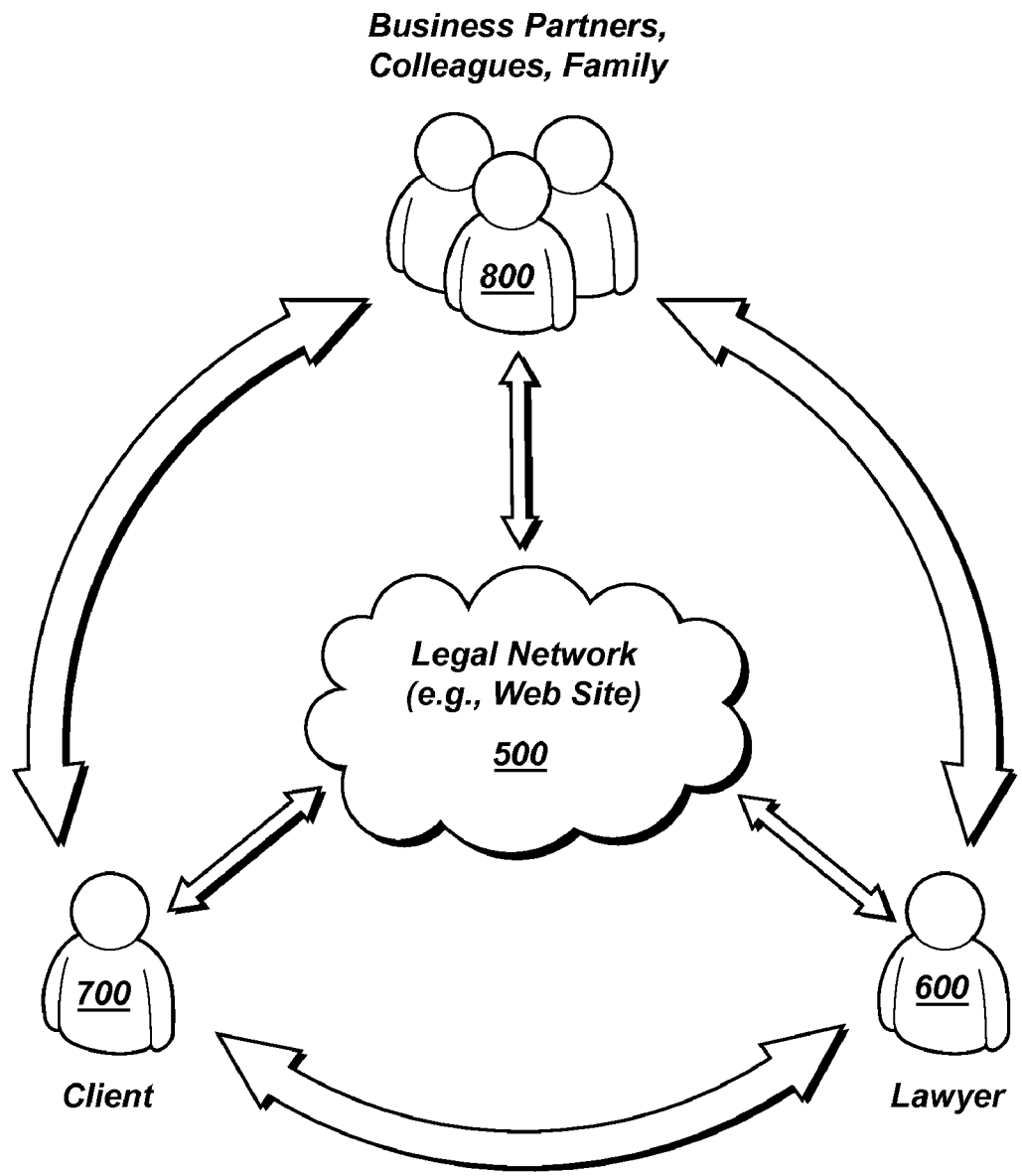
FIG. 6 is a schematic overview of the system

Referring to FIG. 6, the disclosed system or legal network 500 is shown to reside upon a website or server system. Clients 700, lawyers 600 as well as business partners, colleagues, and family 800 may use disclosed legal network system 500 to facilitate commerce, to produce, review and transmit documents, and to facilitate dispute resolution.

The invention includes the following items:

Item 1. A networked based system for creating, managing, and sharing documents with customers and counsel and for resolving possible disputes between users of the system, the system comprising:

a) a host site computer system with means of communication with originator computers and lawyer computers;
b) the host site computer having an originator module with means of:
  i. presenting a plurality of legal document forms;
  ii. presenting a context sensitive help window, the window making available printed, video or live person help information;
  iii. presenting questions to an originator and accepting responses from an originator;
  iv. populating a selected legal form with the information entered by an originator;
  v. displaying a selected legal form before or after originator supplied information is added to the legal form;
  vi. sending the selected legal form to a document manager module;
c) the host site computer having a document manager module with means of:
  i. providing an originator the choice of sharing a legal form with a known lawyer and if no lawyer is known to the originator, providing means of searching for participating lawyers via communication with a lawyer management module;

ii. confirming the identity of the selected lawyer to confirm the presented name and email address of the selected lawyer;
iii. preventing shared documents from being opened by a lawyer until the lawyer accepts a engagement proposal from an originator and further preventing a lawyer from opening a shared document until the identity of the lawyer has been confirmed by the originator;
iii. presenting shared documents with the appropriate originator;
iv. presenting shared documents with the appropriate lawyer;
vi. communicating with a lawyer management module;
v. allowing lawyers and originators to make changes and track changes to shared documents;
d) the host site computer having a lawyer management module with means of providing:
 i. a presentation of biographical information of participating lawyers to originators;
 ii. registration and login functions to lawyers;
 iii. lawyers the option of accepting or rejecting proposed engagements with originators;
e) the host site computer having a nonjudicial resolution module with means of providing:
 i. registration and login functions to arbitrators, lawyers and originators;
 ii. all relevant documents to the arbitrators;
 iii. the delivery of briefs from lawyers and originators to arbitrators;
 iv. an escrow account to hold any assets or fees subject to the arbitration proceeding.

What is claimed is:

1. a networked based and computer implemented system for creating, managing, and sharing documents with originators and lawyers and for resolving disputes, the system comprising:
 a) a host site computer system in communication via a network with originator computers and lawyer computers;
 b) the host site computer having an originator module, the originator module:
  i. displaying a plurality of interactive legal document forms, for selection by an originator;
  ii. displaying an interactive and context sensitive help window, the window making available printed, video or live person help information to the originator;
  iii. displaying questions to the originator and accepting responses from the originator;
  iv. populating an originator selected legal form with the information entered by the originator;
  v. displaying the originator selected legal form before and after originator supplied information is added to the originator selected legal form;
  vi. sending the originator selected legal form to a document manager module;
 c) the host site computer further including the document manager module, the document manager:
  i. displaying to the originator the choice of sharing the selected legal form with a known lawyer and if no lawyer is known to the originator, displaying to the originator a search page of participating lawyers, the participating lawyers displayed by a lawyer management module;
  ii. requiring the originator to personally confirm the identity of a selected lawyer by confirming the displayed name and email address of the selected lawyer found within an electronic communication from the selected lawyer;
  iii. denying the selected lawyer access to shared documents until the selected lawyer accepts an engagement proposal from the originator and further denying the selected lawyer access to the shared documents until the identity of the selected lawyer has been confirmed by the originator, the identity of the selected lawyer being confirmed by the client, by the client personally reviewing the email address of an email sent by the lawyer;
  iii. displaying shared documents with the originator;
  iv. displaying shared documents with the lawyer;
  vi. communicating with a lawyer management module;
  v. allowing the lawyer and the originator to make changes and track changes to shared documents;
 d) the host site computer further including the lawyer management module, the lawyer management module:
  i. displaying biographical information of participating lawyers to originators;
  ii. displaying registration and login functions to lawyers;
  iii. displaying to the lawyers the option of accepting or rejecting proposed engagements with originators;
 e) the host site computer further including a nonjudicial resolution module, the nonjudicial resolution module:
  i. displaying registration and login functions to arbitrators, lawyers and originators;
  ii. displaying all relevant documents to the arbitrators;
  iii. transmitting briefs from lawyers and originators to arbitrators;
  iv. providing an escrow account to hold any assets or fees subject to the arbitration proceeding.

2. A method of operating a computer system, the method comprising the steps of:
 a) operating a host site computer system, the host site computer system in communication with originator computers and lawyer computers;
 b) the host site computer having an originator module and using the originator module for:
  i. displaying a plurality of legal document forms;
  ii. displaying an interactive and context sensitive help window, the window making available printed, video or live person help information;
  iii. displaying questions to the originator and accepting responses from the originator;
  iv. populating a selected legal form with the information entered by the originator;
  v. displaying the selected legal form before and after originator supplied information is added to the legal form;
  vi. sending the selected legal form to a document manager module;
 c) the host site computer including the document manager module and using the document manager for:
  i. displaying to an originator the choice of sharing a legal form with a known lawyer and if no lawyer is known to the originator, transmitting an interactive display allowing the originator to search for participating lawyers by use of a lawyer management module;
  ii. confirming the identity of the selected lawyer to confirm the displayed name and email address of the selected lawyer;
  iii. denying the lawyer access to shared documents until the selected lawyer accepts a engagement proposal from the originator and further denying the selected lawyer access to the shared documents until the identity of the selected lawyer has been confirmed by the originator;
iii. displaying the shared documents with the appropriate originator;
iv. displaying the shared documents with the appropriate lawyer;
vi. communicating with a lawyer management module;
v. allowing lawyers and originators to make changes and track changes to shared documents;

d) the host site computer having the lawyer management module, and using the lawyer management module to provide:
i. a display of biographical information of participating lawyers to originators;
ii. an interactive display for registration and login functions to lawyers;
iii. an interactive display for lawyers accepting or rejecting proposed engagements with originators;

e) the host site computer having a nonjudicial resolution module, and using the nonjudicial resolution module for providing:
i. an interactive display for registration and login functions to arbitrators, lawyers and originators;
ii. display of all relevant documents to the arbitrators;
iii. transmission of briefs from lawyers and originators to arbitrators;
iv. an escrow account to hold any assets or fees subject to the arbitration proceeding.

3. A computer implemented method for creating, managing, and sharing documents with originators and lawyers and for resolving disputes, the method executed by one or more processors configured to perform the following operations:
a) operating a host site computer system, the host site computer system comprising one or more processors instructed to be in communication with originator computers and lawyer computers;
b) the host site computer having an originator module and using the originator module for:
i. displaying a plurality of interactive legal document forms;
ii. displaying an interactive context sensitive help window, the window making available printed, video or live person help information;
iii. displaying questions to an originator and accepting responses from an originator;
iv. populating a selected legal form with the information entered by an originator;
v. displaying a selected legal form before and after originator supplied information is added to the legal form;
vi. sending the selected legal form to a document manager module;

c) the host site computer including the document manager module and using the document manager for:
i. displaying to an originator the choice of sharing a legal form with a known lawyer and if no lawyer is known to the originator, allowing the originator to search for participating lawyers via communication with a lawyer management module;
ii. confirming the identity of the selected lawyer to confirm the presented name and email address of the selected lawyer;
iii. denying a selected lawyer access to shared documents until the selected lawyer accepts an engagement proposal from an originator and further denying the selected lawyer access to the shared documents until the identity of the selected lawyer has been confirmed by the originator;
iii. displaying shared documents with the appropriate originator;
iv. displaying shared documents with the appropriate lawyer;
vi. communicating with a lawyer management module;
v. displaying shared documents to lawyers and originators to make changes and track changes to shared documents;

d) the host site computer having a lawyer management module, and using the lawyer management module to provide:
i. a display of biographical information of participating lawyers to originators;
ii. an interactive display with registration and login functions to lawyers;
iii. an interactive display showing lawyers the option of accepting or rejecting proposed engagements with originators;

e) the host site computer having a nonjudicial resolution module, and using the nonjudicial resolution module for providing:
i. an interactive display for registration and login functions to arbitrators, lawyers and originators;
ii. the display of all relevant documents to the arbitrators;
iii. the delivery of briefs from lawyers and originators to arbitrators;
iv. an escrow account to hold any assets or fees subject to the arbitration proceeding.

\* \* \* \* \*